United States Patent
Tardo et al.

(10) Patent No.: US 6,557,105 B1
(45) Date of Patent: Apr. 29, 2003

(54) APPARATUS AND METHOD FOR CRYPTOGRAPHIC-BASED LICENSE MANAGEMENT

(75) Inventors: Joseph John Tardo, Palo Alto, CA (US); Jean-Marc Frailong, Portola Valley, CA (US); Harold Lee Mendoza, Sunnyvale, CA (US); Shiv Haris, Palo Alto, CA (US)

(73) Assignee: Tut Systems, Inc., Pleasanton, CA (US)

( * ) Notice: Subject to any disclaimer, the term of this patent is extended or adjusted under 35 U.S.C. 154(b) by 0 days.

(21) Appl. No.: 09/291,918

(22) Filed: Apr. 14, 1999

(51) Int. Cl.[7] .................................................. G06F 1/30
(52) U.S. Cl. ....................... 713/193; 713/170; 713/176; 713/179
(58) Field of Search ................................. 713/170, 176, 713/175, 179, 193

(56) References Cited

U.S. PATENT DOCUMENTS 5,724,425 A * 3/1998 Chang et al. ................. 380/30

* cited by examiner

*Primary Examiner*—Thomas R. Peeso
(74) *Attorney, Agent, or Firm*—Blakely, Sokoloff, Taylor & Zafman, LLP

(57) ABSTRACT

Embodiments of the present invention provide a cryptographic-based license management device comprising a license authority configured to generate a license in response to a product option request; an interface module having a plurality of product options that may be selectively enabled in response to a valid license issued by the license authority; a non-volatile memory associated with the interface module, the non-volatile memory module containing a programmable verification component for determining the authenticity of the license; and a license verification module associated with the interface module, the license verification module configured to verify the authenticity of a license using the programmable verification component contained within the non-volatile memory and enable selected product options provided the license is verified by the license verification module.

Another feature of the present invention provides a method for cryptographic-based license management, the method comprising, generating a license in response to a product option request, the product option request identifying selected product options associated with an interface module; applying a digital signature to the license; supplying the license to an interface module; verifying the digital signature of the license with a verification component associated with the interface module; and enabling the selected product options associated with the interface module provided the digital signature of the license has been verified with the verification component.

28 Claims, 7 Drawing Sheets

300
Generate Gateway Product Option Request for usage of a Gateway Product Option.

305
Generate a License configured to enable the Gateway Product Option specified in the Gateway Product Option Request (Generate License Certification Public Key and License Certification Private Key) - Apply Digital Signature to the License Certification Public Key using Signature Component (Root Private Key).

310
Supply the Signed License Certification Public Key to a License Verification Module.

315
Generate a License Token containing License Token Data - Apply Digital Signature to the License Token using the License Certification Private Key.

320
Encrypt the Signed License Token using an Encyption Key - Supply the Encrypted Signed License Token to the License Verification Module - Decrypt the Encrypted Signed License Token using a Decrytpion Key.

325
Compare Copy of Identification Component contained in the Signed License Token to the Identification Component associated with the Gateway Interface Device.

APPARATUS AND METHOD FOR CRYPTOGRAPHIC-BASED LICENSE MANAGEMENT

FIELD OF THE INVENTION

The present invention relates to an apparatus and method for a cryptographic-based license management. More specifically, the present invention relates to a cryptographic based licensing management system for managing and verifying licenses for associated licensed products of a device.

BACKGROUND

Gateway devices, such as servers and network interface devices, typically allow a user (e.g., client device) to gain access to associated services, software, or databases on other networks through the gateway device itself. Further, some gateway devices may be configured to maintain different service packages or software packages which may be accessed and utilized by a qualified or authorized user. The services or software package maintained on the gateway device typically require a service technician to manually install and maintain the software package and configure the gateway device to allow the user the ability to access and utilize the desired or selected services or software packages.

For instance, a gateway device may be configured to allow a user access to an external network, such as the Internet. In addition, the gateway device may be configured to make use of a software package, such as an Internet content filtering software package, in response to a request from an authorized operator. Accordingly, the operator of the gateway device is required to manually install the software package and configure the gateway device (e.g., set passwords, configure protocol, establish ports, enable licensed usage, etc.) to allow use of the desired software package (i.e., Internet content filtering software package). Further, the operator of the gateway device must also track how long the use of such software package is authorized or licensed (e.g., time period), and accordingly disable or remove the software package when the software package is no longer authorized or licensed.

Accordingly, when the software package is no longer licensed or otherwise authorized, the operator of the gateway device is required to manually reconfigure the gateway device to prevent the unauthorized access to the desired software package. Such operations can become time consuming and unmanageable as an operator of a gateway device typically does not operate a single gateway device, but rather may operate hundreds or even thousands of such gateway devices.

Moreover, the operators of such gateway devices are faced with the problem of having to reconfigure hundreds and even thousands of different gateway interface devices at multiple geographically dispersed locations.

It is therefore desirable to provide a system which allows the operator of a gateway device the ability to remotely configure and authorize the usage of product options (e.g., software or service) of a gateway device through a secure cryptographic-based licensing management system.

SUMMARY OF THE INVENTION

Embodiments of the present invention provide a cryptographic-based license management device comprising a license authority configured to generate a license in response to a product option request; an interface module having a plurality of product options that may be selectively enabled in response to a valid license issued by the license authority; a non-volatile memory associated with the interface module, the non-volatile memory module containing a programmable verification component for determining the authenticity of the license; and a license verification module associated with the interface module, the license verification module configured to verify the authenticity of a license using the programmable verification component contained within the non-volatile memory and enable selected product options provided the license is verified by the license verification module.

Another feature of the present invention provides a method for cryptographic-based license management, the method comprising, generating a license in response to a product option request, the product option request identifying selected product options associated with an interface module; applying a digital signature to the license; supplying the license to an interface module; verifying the digital signature of the license with a verification component associated with the interface module; and enabling the selected product options associated with the interface module provided the digital signature of the license has been verified with the verification component.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

In one embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

Figure 1:
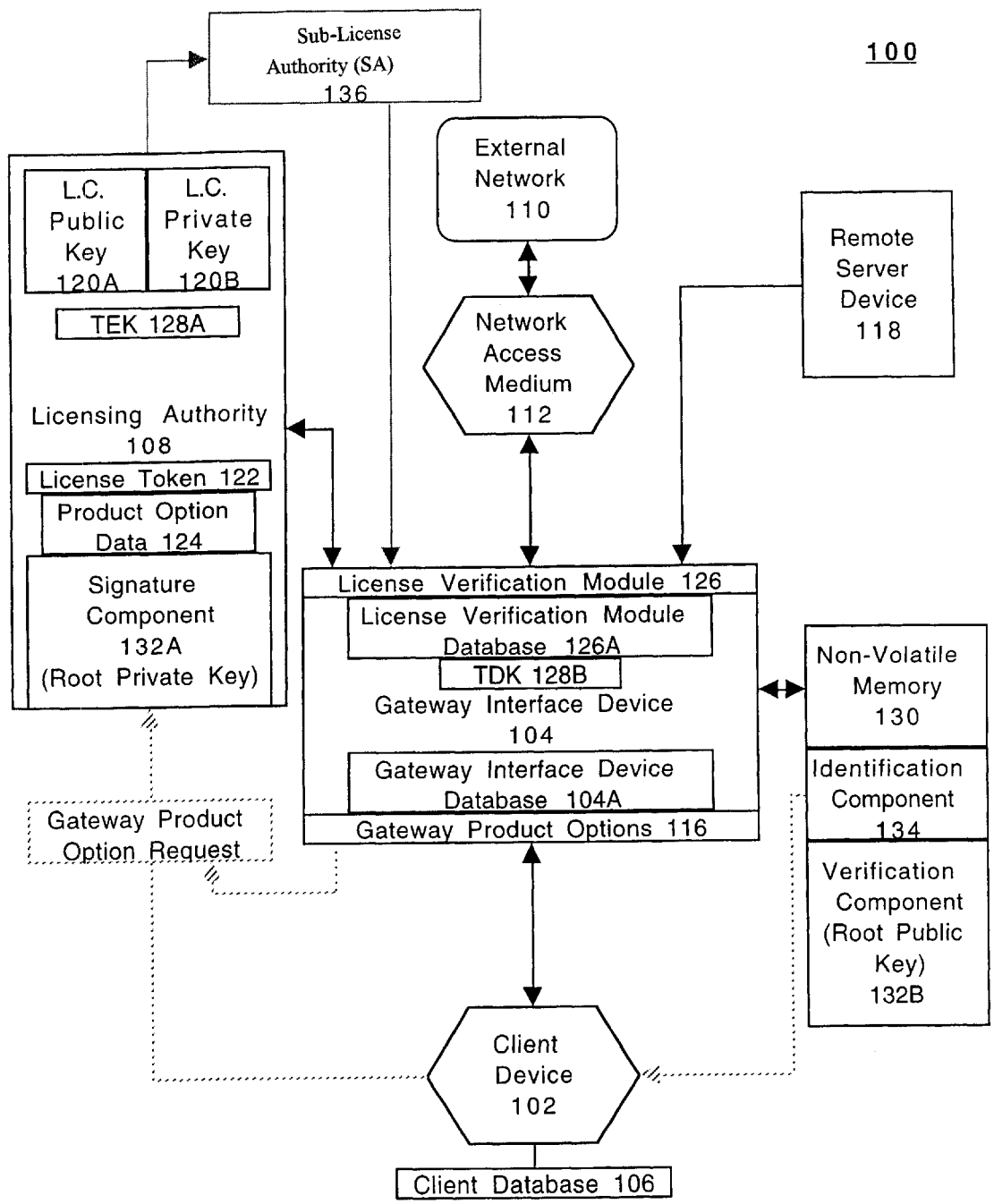
FIG. 1 illustrates an embodiment of a cryptographic-based software licensing management device in accordance with the teachings of one embodiment of the present invention.

FIG. 1 is a block diagram of an embodiment of a cryptographic based software licensing management system 100 capable of implementing the teachings of the present invention. FIG. 1 illustrates a client device 102 (e.g., user device) which is operatively coupled to a gateway interface device 104 via a communication link. The client device 102 may comprise a client computer network containing a number of computers or computing devices coupled into a network configuration (Ethernet, token-ring, FDDI, or any other network configuration). Alternately, the client device may simply comprise a single computer for which external access is desired.

In one embodiment, as illustrated in FIG. 1, the client device 102 maintains an associated client database 106. The associated client database 106 may be configured to contain application program interfaces (API's) for transparent communication between the client device 102 and various external services or devices (e.g., gateway interface device 104), as well as, communications between the client device 102 and a Licensing Authority (LA) 108. In one embodiment, the Licensing Authority (LA) 108 is located at a remote location with respect to the location of the gateway interface device 104.

Further, the associated client database 106 may be configured to maintain data regarding data transfers, operational settings, gateway product options, or general operations regarding the client device 102 and the gateway interface device 104. For instance, in one embodiment, the associated client database 106 maintains a listing of the enabled gateway product options associated with gateway interface device 104 that are enabled for use by the client device 102.

In one embodiment, as illustrated in FIG. 1, the gateway interface device 104 may be operatively coupled to an external network 110, such as the Internet, through an associated network access medium 112, such as an Internet Service Provider (ISP), which allows the client device 102 access to the external network 110. The network access medium 112 provides the necessary routers and gateway devices for connection to the external network 110 from the client device 102, and provides various protocol and packet function switching functions.

In one embodiment of the present invention, the various physical network interface devices, security functions, and service interfaces, such as provided by the network access medium 112, are provided by the gateway interface device 102. As such, the gateway interface device 104 is able to function as a single integrated network interface device.

The gateway interface device 104 provides a singular point of connectivity for different types of communication lines, such as Ethernet and ISDN, and an associated database 104A for the storage of parameters associated with the operation of the gateway interface device 104. The gateway interface device 104 is also configured to contain application program interfaces (API's) for transparent communication between the client device 102 and various external services (e.g., Internet), in addition to communications between the client device 102 and the gateway interface device 104.

The gateway interface device 104 further provides for communication between the gateway interface device 104 and the Licensing Authority (LA) 108. The Licensing Authority (LA) 108 is configured to issue licenses, discussed in further detail below, for enabling the use of select gateway product options 116 (e.g., software options and services, hardware options, software products, network services, etc.) associated with or maintained on the gateway interface device 104.

As such, the gateway interface device 104 is configured to contain a series of gateway product options 116 (e.g., software options and services, hardware options, software products, network services, etc.) which may be activated in response to a valid license issued by the remote Licensing Authority (LA) 108. As such, a valid license is used to activate or otherwise enable a gateway product option 116, subject to a process that verifies the authenticity or validity of each license issued by the Licensing Authority (LA) 108. As mentioned, the gateway product options 116 may comprise a variety or combination of operational software packages, specialized gateway services, or a variety of other of gateway operating options.

For instance, one example of a gateway product option 116 may comprise an operational software package, such as an Internet content filtering software package, for filtering the type of information that is able to be received by the client device 102. Yet another example of a gateway product option 116 may comprise a gateway security service such as a data encryption service which automatically protects client device data as the data traverses the external network 110 in an instance of communication with a peer gateway interface device 104. As such, it is envisioned that a wide variety of different gateway product options 116 may be provided by the gateway interface device 104 in accordance with the needs or desires of a particular set of users or client devices 102.

In one embodiment, the gateway product options 116 may be installed in the gateway interface device 104 during manufacture by the manufacturer of the gateway interface device 104. In another embodiment, the gateway product options 116 may be installed by a remote server 118 capable of installing gateway product options 116 into the gateway interface device 104 remotely. In yet another embodiment, the gateway product options 116 may be installed remotely into the gateway interface device 104 by the Licensing Authority (LA) 108 via a secure communication link (not shown) between the gateway interface device 104 and the Licensing Authority (LA) 108.

As indicated above, a variety of different gateway product option installation techniques may be implemented in order to install different gateway product options 116 into the gateway interface device 104. As such, the present invention is not limited to such gateway product option installation techniques, but rather, the above examples are merely illustrative of embodiments of gateway product option installation techniques that may be implemented in the present invention.

As illustrated in FIG. 1, the Licensing Authority (LA) 108 is configured to receive a gateway product option request from the client device 102 associated with the gateway interface device 104, or alternately from the gateway interface device 104 directly. In one embodiment, the gateway product option request indicates the identity of the gateway interface device 104 (i.e., copy of an identification component 134) associated with the requested or selected gateway product option 116, as well as the identification of the gateway product option 116 selected by the user or the client device 102.

In response to the gateway product option request, the Licensing Authority (LA) 108 generates a license which is configured to enable or activate particular gateway product options 116 specified in the gateway product option request, subject to a process that verifies the authenticity or validity of the license issued by the Licensing Authority (LA) 108.

In one embodiment, the Licensing Authority (LA) 108 generates a pair of license certification keys 120 (license certification public key 120A and license certification private key 120B) and a license token 122 in response to the gateway product option request. The pair of license certification keys 120 (license certification public key 120A and license certification private key 120B) and the license token 122 are used in combination to form the license that is used to enable or activate particular gateway product options 116 specified in the gateway product option request, subject to a process that verifies the authenticity or validity of the license issued by the Licensing Authority (LA) 108.

In one embodiment, the license token 122 generated by the Licensing Authority (LA) 108 is configured to contain gateway product option data 124 for enabling the particular gateway product option 116 identified in the gateway product option request. The license token data 124 may contain information such as, but not limited to: the duration period of the license (i.e., license duration); the identity of the particular gateway product option; the identity of the gateway interface device (i.e., identification component 134) associated with the gateway product option request; configuration information for configuring the particular gateway product option; and a variety of other desired or necessary option data associated with the particular gateway product option or options selected.

Accordingly, the Licensing Authority (LA) 108 is configured to contain a signature component 132A, also referred to as a Root Private Key, discussed in further detail below, that is used to sign or apply a digital signature to the license certification public key 120A. The signed license certification public key 120A, also referred to as a certification certificate, is then supplied to a License Verification Module (LVM) 126 associated with the gateway interface device 104. In one embodiment, the signed license certification public key 120A may be stored, either permanently or temporarily, in a database 126A associated with the License Verification Module (LVM) 126.

Moreover, the Licensing Authority (LA) 108 is configured to sign or apply a digital signature to the license token 122 using the license certification private key 120B. The signed license token 122 containing the license token data 124 is then supplied to the License Verification Module (LVM) 126 associated with the gateway interface device 104.

In one embodiment, the Licensing Authority (LA) 108 is configured to encrypt the signed license token 122 with a token encryption key (TEK) 128A before supplying the signed license token 122 to the License Verification Module (LVM) 126. Accordingly, upon receiving the encrypted signed license token 122 the License Verification Module (LVM) 126 is configured to decrypt the encrypted signed license token 122 with a corresponding token decryption key (TDK) 128B that is maintained by the License Verification Module (LVM) 126.

Accordingly, after the license (i.e., the signed license certification public key 120A and the signed license token 122) has been supplied to the License Verification Module (LVM) 126, the License Verification Module (LVM) 126 verifies the authenticity or validity of the license issued by the Licensing Authority (LA) 108.

In one embodiment, before the License Verification Module (LVM) 126 verifies the authenticity or validity of the license issued by the Licensing Authority (LA) 108, the License Verification Module (LVM) 126 verifies that the signed license token 122 has been sent to the proper gateway interface device 104. As such, the License Verification Module (LVM) 126 examines the license token 122 (i.e., copy of the identification component 134) to determine the identity of the gateway interface device 104 that is contained in the signed license token 122, as supplied to the Licensing Authority (LA) 108 in the original gateway product option request.

Correspondingly, the License Verification Module (LVM) 126 verifies that the signed license token 122 has been sent to the proper gateway interface device 104 by comparing the identification component (i.e., copy of the identification component 134) contained in the signed license token 122 to an identification component 134 maintained within a nonvolatile memory 130, also referred to as a programmable flash memory (e.g., EEPROM), associated with the gateway interface device 104. The identification component 134 maintained within the nonvolatile memory 130 (e.g., EEPROM) may be programmed into the nonvolatile memory 130 during or after manufacture, or at any desired point thereafter.

Provided that the License Verification Module (LVM) 126 verifies that the signed license token 122 has been sent to the proper gateway interface device 104 by comparing the copy of the identification component 134 in the signed license token 122 against the identification component 134 maintained within the nonvolatile memory 130, the License Verification Module (LVM) 126 proceeds to verify the authenticity or validity of the license. Otherwise, if the License Verification Module (LVM) 126 determines that the signed license token 122 has not been sent to the proper gateway interface device 104, the process is stopped and an error message is generated.

Accordingly, after receiving the license, the License Verification Module (LVM) 126 verifies the authenticity or validity of the license, as issued by the Licensing Authority (LA) 108, using a programmable verification component 132B, also referred to as a Root Public Key, which corresponds to the signature component 132A or Root Private Key. The programmable verification component 132B or Root Public Key is maintained within the nonvolatile memory 130 (e.g., EEPROM) associated with the gateway interface device 104. As such, the programmable verification component 132B or Root Public Key is used to verify the signature of the signed license certification public key 120A (i.e., signature applied by the Root Private Key 132A) received from the Licensing Authority (LA) 108.

The programmable verification component 132B or Root Public Key maintained within the nonvolatile memory 130 (e.g., EEPROM) may be programmed into the nonvolatile memory 130 during or after manufacture, or at any desired time thereafter. As such, in one embodiment, the programmable verification 132B and identification component 134 may be programmed into the nonvolatile memory 130 during manufacture. In an alternate embodiment, the programmable verification 132B and identification component 134 may be programmed into the nonvolatile memory 130, either directly or remotely, after manufacture.

Next, provided that the signature applied to the signed license certification public key 120A has been previously verified using the programmable verification component 132B or Root Public Key, the License Verification Module (LVM) 126 proceeds to verify the digital signature of the signed license token 122 (i.e., signature applied by the license certification private key 120B) using the signed license certification public key 120A. Provided the digital signature of the signed license token 122 (i.e., signature applied by the license certification private key 120B) is verified using the signed license certification public key 120A the license is considered valid.

Accordingly, after verifying the license issued by the Licensing Authority (LA) 108 and determining that the license is valid, the License Verification Module (LVM) 126 proceeds to install the license token 122 into the gateway interface device 104, provided that the license token data 124 is appropriate for the specified gateway interface device 104 (e.g., operable on the gateway interface device 104).

In one embodiment of the present invention, the installed license token 122 containing the necessary license token data 124 for enabling the particular gateway product option 116, immediately enables the particular gateway product option 116 identified in the original gateway product option request. Accordingly, the license token 122 enables or activates the gateway product option 116 specified in the original gateway product option request in accordance with the license token data 124 contained in the license token 122 (i.e., license token data 124 such as, but not limited to: the duration period of the license (i.e., license duration); the identity of the particular gateway product option; the identity of the gateway interface device (i.e., identification component 134) associated with the gateway product option request; configuration information for configuring the particular gateway product option; and a variety of other desired or necessary option data associated with the particular gateway product option or options selected).

In an alternate embodiment, the user's actual product request to use the particular gateway product option 116 after installation of the license token 122 triggers a option license validation process, wherein the license for the gateway product option 116 is validated before actually enabling the gateway product option 116.

Initially, after installation of the license token 122, the user makes a product request to the gateway interface device 104 to use the particular gateway product 116. In response to the product request, the License Verification Module (LVM) 126 loads the license token data 124 contained in the license token 122 into the selected gateway product option 116. The gateway product option data 124 is used to enable the operation of the gateway product option 116 upon validation of the gateway product license.

Accordingly, the selected gateway product option 116 generates a license validation request which is supplied to the License Verification Module (LVM) 126. In response to the license validation request, the License Verification Module (LVM) 126 verifies that the license is valid (i.e., the selected gateway product option may be used or otherwise enabled) for the selected gateway product option 116 identified in the license validation request.

In one embodiment, the License Verification Module (LVM) 126 verifies that the license is valid by periodically, or in accordance with other policy, re-verifying the signatures of the signed license certification public key 120A (i.e., signature applied by the Licensing Authority (LA) 108) and the signature of the signed license token 122 (i.e., signature applied by the license certification private key 120B).

In another embodiment, the License Verification Module (LVM) 126 examines the license token data 124, contained in the license token 122, which specifies the operational parameters of the actual license (e.g., expiration date, type of usage, access privileges, etc.) in order to determine whether the license is valid for the selected gateway product option 116 identified in the license validation request (i.e., the selected gateway product option 116 may be used or otherwise enabled).

As indicated above, a variety of different license validation processes may be implemented in order to validate or verify that the license is valid before actually enabling the specified gateway product option 116. As such, the present invention is not limited to such license validation processes, but rather, the above examples are merely illustrative of embodiments of different license validation processes that may be implemented in the present invention.

Accordingly, after the License Verification Module (LVM) 126 verifies that the license is valid (e.g., the duration period of the license is valid) for the selected gateway product option 116 identified in the license validation request, the selected gateway product option 116 identified in the license validation request is enabled or otherwise activated for use.

In one embodiment, the License Verification Module (LVM) 126 generates and supplies a data message to the selected gateway interface device 104, the data message indicating that the license for the selected gateway product option 116 is valid and that the selected gateway product option 116 may be used or otherwise enabled. Accordingly, in response to the data message indicating that the license for the selected gateway product option 116 is valid, the selected gateway product option 116 is enabled or otherwise activated.

In an alternate embodiment, the License Verification Module (LVM) 126 generates and supplies the data message to the client device 102, the data message containing validation data indicating that the license for the selected gateway product option 116 is valid and that the selected gateway product option 116 may be used or otherwise enabled. Accordingly, the client device 102 may then supply the data message to the selected gateway interface device 104 to enable or otherwise activate the selected gateway product option 116.

In one embodiment, it is envisioned that the License Authority (LA) 108 can provide the license certification private key 120B to a Sub-License Authority or Authorities (SA) 136. Likewise, the gateway interface device 104 is configured to contain gateway product options 116 associated with the Sub-License Authority (SA). Accordingly, the Sub-License Authority (SA) 136 can generate a license token 122 and apply a digital signature to the license token 122 using the license certification private key 120B, similar to the technique described above. Accordingly, the license token 122 is used to enable or activate the gateway product option 116 associated with the Sub-License Authority (SA) 136 that resides on the gateway interface device 104.

As such, the License Authority (LA) 108 can facilitate usage of different gateway product options 116 associated with the Sub-License Authority (SA) 136 by providing the license certification private key 120B to the Sub-License Authority (SA) 136. Accordingly, the Sub-License Authority (SA) 136 can generate and provide a signed license token 122, containing license token data 124, to enable selected gateway product options 116 associated with the Sub-License Authority (SA) 136.

Accordingly, the Licensing Authority (LA) 108 supplies the signed license certification public key 120A, which corresponds to the license certification private key 120B given to the Sub-License Authority (SA) 136, to the License Verification Module (LVM) 126 associated with the selected gateway interface device 104. Accordingly, when the signed license token 122 is supplied to the gateway interface device 104 from the Sub-License Authority (SA) 136, the License Verification Module (LVM) 126 uses the technique described above to verify or authenticate the validity of the license for the gateway product options 116 associated with the Sub-License Authority (SA) 136. In particular, the License Verification Module (LVM) 126 verifies or authenticates the signature of the license (i.e., signature applied to the license token 122 by the Sub-License Authority (SA) 136) using the signed license certification public key 120A supplied by the Licensing Authority (LA) 108 and the programmable verification component 132B or Root Public Key maintained in the non-volatile memory 130, using the technique described above.

As such, it is envisioned that the Licensing Authority (LA) 108 may be used to facilitate the use of different gateway product options 116 associated with different Sub-License Authorities (SA) 136, while maintaining control over the issuance of the license certification private key 120B, which may be supplied to the Sub-License Authority (SA) 136 by the Licensing Authority (LA) 108, and thereby maintain control over all of the different gateway product options 116 associated with the gateway device 104.

Figure 2:
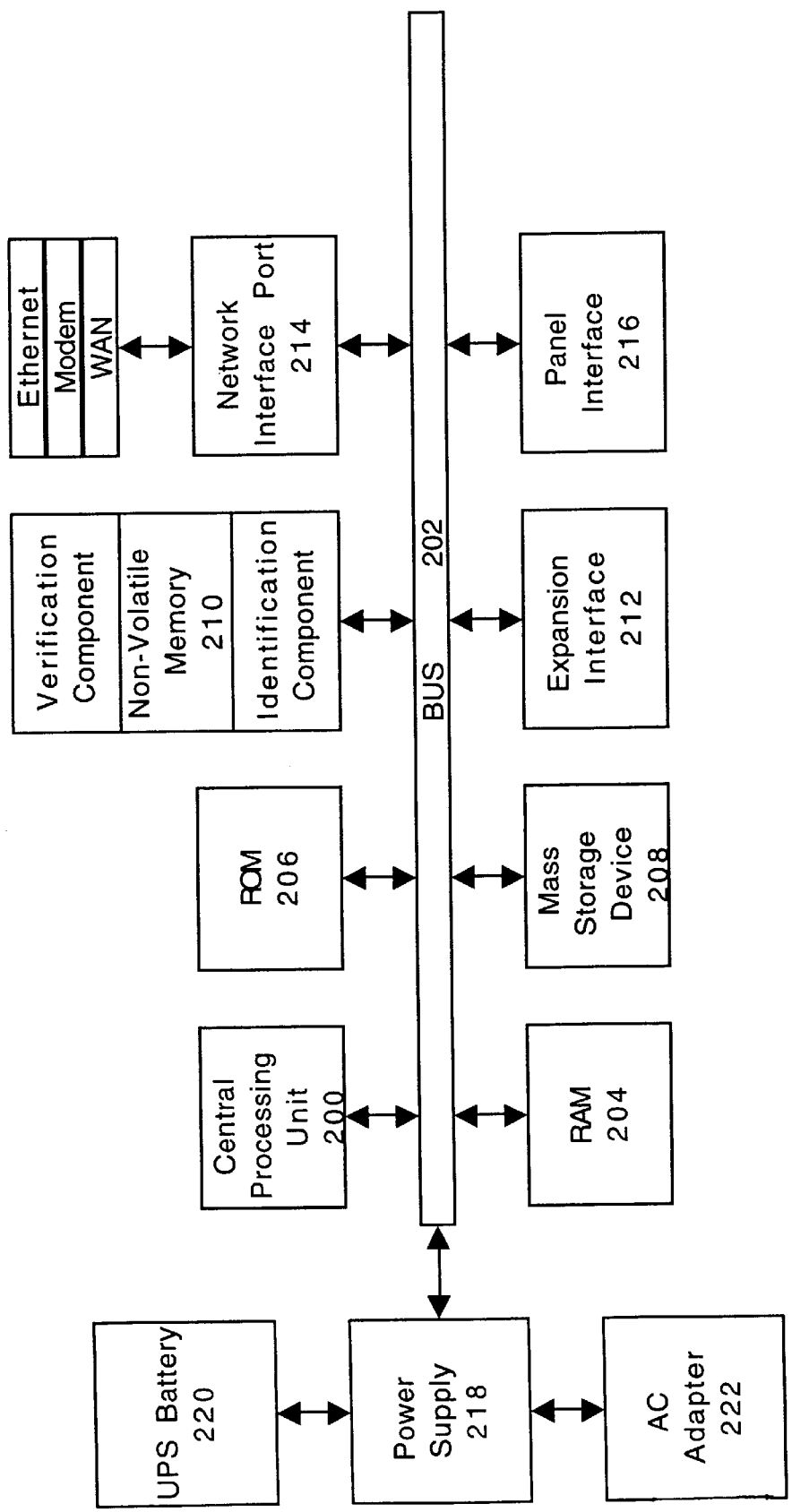
FIG. 2 illustrates an embodiment of a gateway interface device in accordance with the teachings of one embodiment of the present invention.

FIG. 2 is a block diagram illustrating an embodiment of representative hardware components within gateway interface device 104 of FIG. 1. Gateway interface device includes central processing unit 200 coupled through a bus 202 to random access memory (RAM) 204, read-only memory (ROM) 206, and mass storage device 208. Mass storage device 208 can be any type of memory device which provides persistent storage of large amounts of data such as hard disk drives, tape drives, or memory cards.

In one embodiment of the present invention, the mass storage device 208 is a removable device which can be moved from gateway interface device 104 to another similar gateway interface device 104, or removed for replacement by other like mass storage devices with either updated or different data or programs.

Gateway interface device 104 also contains non-volatile memory 210 (i.e., a memory that retains stored contents when power is turned off) in the form of a programmable flash memory 210. The programmable flash memory 210 stores critical system parameters (e.g., programmable verification and identification components) that may be programmed into the programmable flash memory 210 during or after manufacture. As such, in one embodiment, the programmable verification and identification components may be programmed into the programmable flash memory 210 during manufacture. In an alternate embodiment, the programmable verification and identification components may be programmed into the programmable flash memory 210, either directly or remotely, after manufacture.

Further, the programmable flash memory 210 may be upgraded remotely from a remote server, such as the remote server 118 of FIG. 1. In one embodiment, the programmable flash memory 210 may comprise, for example, a flash EEPROM (Electrically Erasable Programmable Read Only Memory) or a FRAM™ (Ferroelectric Random Access Memory), or a variety of other types of programmable flash memory.

The programmable flash memory 210 is configured, such as during manufacture, to contain a unique identifier or identification component that identifies the respective gateway interface device 104. As such, programmable flash memory 210 of the gateway interface device 104 contains an identification component that is unique to the individual gateway interface device 104. Accordingly, the unique identifier or identification component is contained in the gateway product option request, either automatically or manually by the client device, in order to identify the gateway interface device 104 to the respective remote Licensing Authority (LA) 108, and later to the License Verification Module (LVM) 126.

Further, the programmable flash memory 210 is configured, such as during manufacture, to contain a programmable verification component, also referred to as a Root Public Key, that is used to authenticate digital signatures. For instance, in one embodiment, the programmable verification component or Root Public Key is used to authenticate the digital signature applied to the license certification public key.

Correspondingly, a signature component, also referred to as a Root Private Key, which corresponds to the programmable verification component or Root Public Key, is maintained by the Licensing Authority (LA) 108. The Root Private Key is used by the Licensing Authority (LA) 108 to sign or apply a digital signatures, such as to the license certification public key which is supplied to the License Verification Module (LVM) 126.

Therefore, a corresponding set of components is maintained by the system, wherein a programmable verification component or Root Public Key, is maintained in the programmable flash memory 210 and a corresponding signature component or Root Private Key, which corresponds to the programmable verification component or Root Public Key, is maintained by the Licensing Authority (LA) 108.

Therefore, the programmable flash memory 210 is configured, such as during manufacture, to contain a verification component, such as the Root Public Key, which corresponds to a signature component, such as the Root Private Key maintained by the Licensing Authority (LA) 108.

Referring back to FIG. 2, an expansion interface 212 is also illustrated as being coupled to the bus 202. Expansion interface 212 provides physical and logical lines that allow for the installation of industry standard expansion cards to expand the functionality of the gateway interface device 104. Such expansion functions could include additional memory capacity or an alternate network interface means. Gateway interface device 104 interfaces to external networks through a network interface port 214. In one embodiment of the present invention, network interface 214 includes four separate network interface connections and standards. Network interface 214 provides access to modem port, WAN interface, and Ethernet port. In one embodiment of the present invention, two Ethernet ports are provided by network interface 214.

Panel interface 216 provides the main physical interface between the user (e.g., client device 102) and the gateway interface device 104. In one embodiment of the present invention, panel interface 216 is coupled to a front panel display and control system.

System power to the gateway interface device 104 is supplied through power supply 218. Connected to power supply is an uninterruptable power supply (UPS) battery 220 and an AC adapter 222. In one embodiment of the present invention, the gateway interface device 104 is packaged in a 19-inch form factor box.

Figure 3A:
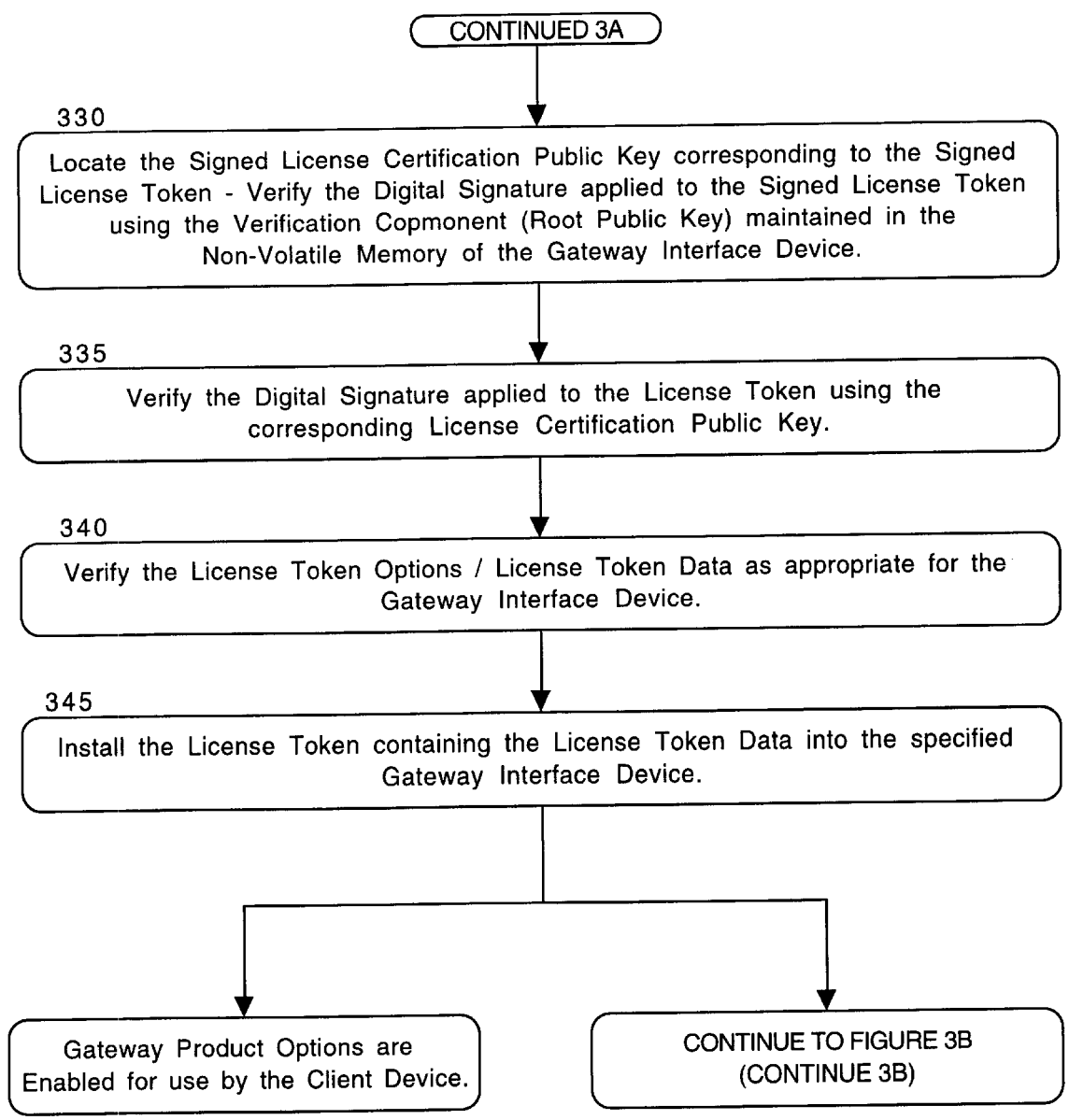
FIG. 3A illustrates an embodiment of a method, in a block-flow diagram format, for use in an embodiment of a cryptographic-based software licensing management device in accordance with the teachings of one embodiment of the present invention.

FIG. 3A illustrates an embodiment of a method, in a block-flow diagram format, for use in an embodiment of a cryptographic based software licensing management device.

Initially at Block 300, a user or client device 102 associated with the gateway interface device 104 makes a gateway product option request for the usage or activation of a particular gateway product option 116 that is associated with a gateway interface device 104. Accordingly, in one embodiment, the gateway product option request contains (1) an identifier or copy of an identification component 134 associated with the particular gateway interface device 104 for which the particular gateway product option 116 is desired; and (2) the identification of the particular gateway product option 116 that is desired to be used or otherwise activated. As such, the gateway product option request contains a copy of an identification component 134 associated with a particular gateway interface device 104, as well as, the identification of the particular gateway product option 116 associated with the gateway interface device 104 that is desired to be used or otherwise activated. Accordingly, the gateway product option request is supplied to a Licensing Authority (LA) 108.

At Block 305, in response to the gateway product option request, the Licensing Authority (LA) 108 generates a license which is configured to enable or activate particular gateway product options 116 specified in the gateway product option request, subject to a process that verifies the authenticity or validity of the license issued by the Licensing Authority (LA) 108.

In one embodiment, a Licensing Authority (LA) 108 instantiation generates a pair of license certification keys (license certification public key 120A and license certification private key 120B). Accordingly, the Licensing Authority (LA) 108 signs or applies a digital signature to the license certification public key 120A using a signature component 132A, also referred to as a Root Private Key, thereby creating a signed license certification public key 120A, also referred to as a certification certificate. Correspondingly, a programmable verification component 132B, also referred to as a Root Public Key, which corresponds to the signature component 132A or Root Private Key is maintained within the nonvolatile memory 130 (e.g., EEPROM) associated with the gateway interface device 104 and is used to verify the signature applied to the license certification public key 120A by the Licensing Authority (LA) 108.

Accordingly, at Block 310, after the license certification public key 120A is signed by the Licensing Authority (LA) 108 using the signature component 132A or Root Private Key, the signed license certification public key 120A is supplied to the License Verification Module (LVM) 126. In one embodiment, the License Verification Module (LVM) maintains a local database 126A that is used to store signed license certification public key 120A.

At Block 315, upon supplying the signed license certification public key 120A to the License Verification Module (LVM) 126, the Licensing Authority (LA) 108 generates a license token 122 containing license token data 124 that is used to enable the specified gateway product options 116 of the gateway interface device 104. The license token data 124 comprises information such as, but not limited to: the duration period of the license (i.e., license duration); the identity of the particular gateway product option; the identity of the gateway interface device (i.e., identification component 134) associated with the gateway product option request; configuration information for configuring the particular gateway product option; and a variety of other desired or necessary option data associated with the particular gateway product option or options selected.

In one embodiment of the present invention, the license token 122 contains a copy of an identification component 134, indicated in the original gateway product option request, identifying the gateway interface device 104 associated with the original gateway product option request.

In one embodiment of the present invention, a unsigned copy of the license certification public key 120A is included in the license token 122 for the purpose of locating (e.g., indexing) the corresponding signed license certification public key 120A that is maintained in the License Verification Module (LVM) 126.

Accordingly, after the license token 122 is generated by the Licensing Authority (LA) 108, the Licensing Authority (LA) 108 signs or applies a signature to the license token 122 using the license certification private key 120B generated at Block 305.

In one embodiment, at Block 320, the signed license token 122, from Block 315, is encrypted by a token encryption key 128A. The encrypted signed license token 122 is then supplied to the License Verification Module (LVM) 126. A corresponding token decryption key 128B is maintained in the License Verification Module (LVM) 126 and is used for decrypting the encrypted signed license token 122.

At Block 325, in one embodiment, the License Verification Module (LVM) 126 compares the copy of the identification component 134 contained in the signed license token 122 to ensure that the copy of the identification component 134 contained in the signed license token 122 is the same as, or corresponds to, the identification component 134 associated with the particular gateway interface device 104. Provided the copy of the identification component 134 contained in the signed license token 122 is the same as, or corresponds to, the identification component 134 of the particular gateway interface device 104, the signed license token 122 is passed to Block 330 for further processing. If the copy of the identification component 134 contained in the signed license token 122 is the not same as, or does not correspond to, the identification component 134 associated with the particular gateway interface device 104, an error message is generated, and the signed license token 122 is not passed onto Block 330.

Accordingly, at Block 330, the License Verification Module (LVM) 126 locates the corresponding signed license certification public key 120A, that corresponds to the signed license token 122, within the License Verification Module (LVM) 126.

As indicated above, in one embodiment of the present invention, an unsigned copy of the license certification public key 120A may be included in the license token 122 for the purpose of locating (e.g., indexing) the corresponding signed license certification public key 120A that is contained in the License Verification Module (LVM) 126, such as in a local database 126A associated with the License Verification Module (LVM) 126.

Alternately, a simple indexing protocol may be established in order to allow the License Verification Module (LVM) 126 to locate the corresponding signed license certification public key 120A that corresponds to the signed license token 122 within the License Verification Module (LVM) 126.

Accordingly, upon locating the signed license certification public key 120A that corresponds to the signed license token 122, the License Verification Module (LVM) 126 verifies the signature of the signed license certification public key 120A (i.e., signature applied to the license certification public key 120A using the corresponding signature component 132A or Root Private Key) using the corresponding Root Public Key 132B maintained in the nonvolatile memory 130 (e.g., EEPROM) associated with the gateway interface device 104. The Root Public Key 132B maintained within the non-volatile memory 130 of the gateway interface device 104 is associated with the Root Private Key 132A that applies the digital signature to the license certification public key 120A at Block 310. As such, the Root Public Key 132B maintained in the non-volatile memory 130 of the gateway interface device 104 is used to verify the signature of the signed license certification public key 120A received by the License Verification Module (LVM) 126.

Provided the signature of the signed license certification public key 120A (i.e., signature applied by the Licensing Authority (LA) 108) is verified using the corresponding Root Public Key 132B maintained in the nonvolatile memory 130 (e.g., EEPROM) associated with the gateway interface device 104, the verification process proceeds to Block 335. If the signature of the signed license certification public key 120A (i.e., signature applied by the Licensing Authority (LA) 108) is not verified using the corresponding Root Public Key 132B maintained in the nonvolatile memory 130, an error message is generated, and the verification process is terminated.

Next, at Step 335, the License Verification Module (LVM) 126 verifies the signature of the signed license token 122 (i.e., signature applied to the license token 122 using the license certification private key 120B) using the corresponding license certification public key 120A that corresponds to the license token 122.

Provided the signature of the license token 122 is verified using the corresponding signed license certification public key 120A received by the License Verification Module (LVM) 126, the verification process proceeds to Block 340. If the signature of the license token 122 is not verified the using the corresponding signed license certification public key 120A, an error message is generated, and the verification process is terminated.

At Block 340, provided the signature applied to the license token 122 is verified using the corresponding license certification public key 120A, the license token options or license token data 124 is verified. The license token options or license token data 124 specify the operational parameters of the license (e.g., expiration date of the license, type of usage, access privileges, operability of the gateway product option, etc.). Accordingly, provided the operational parameters of the license are appropriate (e.g. operable) for the gateway interface device 104, the process proceeds to Block 345, otherwise, an error message is generated and the process is terminated.

Subsequently, at Block 345, the license token 122 containing the necessary license token data 124 for enabling the particular gateway product option(s) 116 identified in the request is installed in the gateway interface device 104.

In one embodiment of the present invention, the installed license token 122 containing the necessary license token data 124 for enabling the particular gateway product option(s) 116, immediately enables the particular gateway product option(s) 116 identified in the original gateway product option request.

Figure 3B:
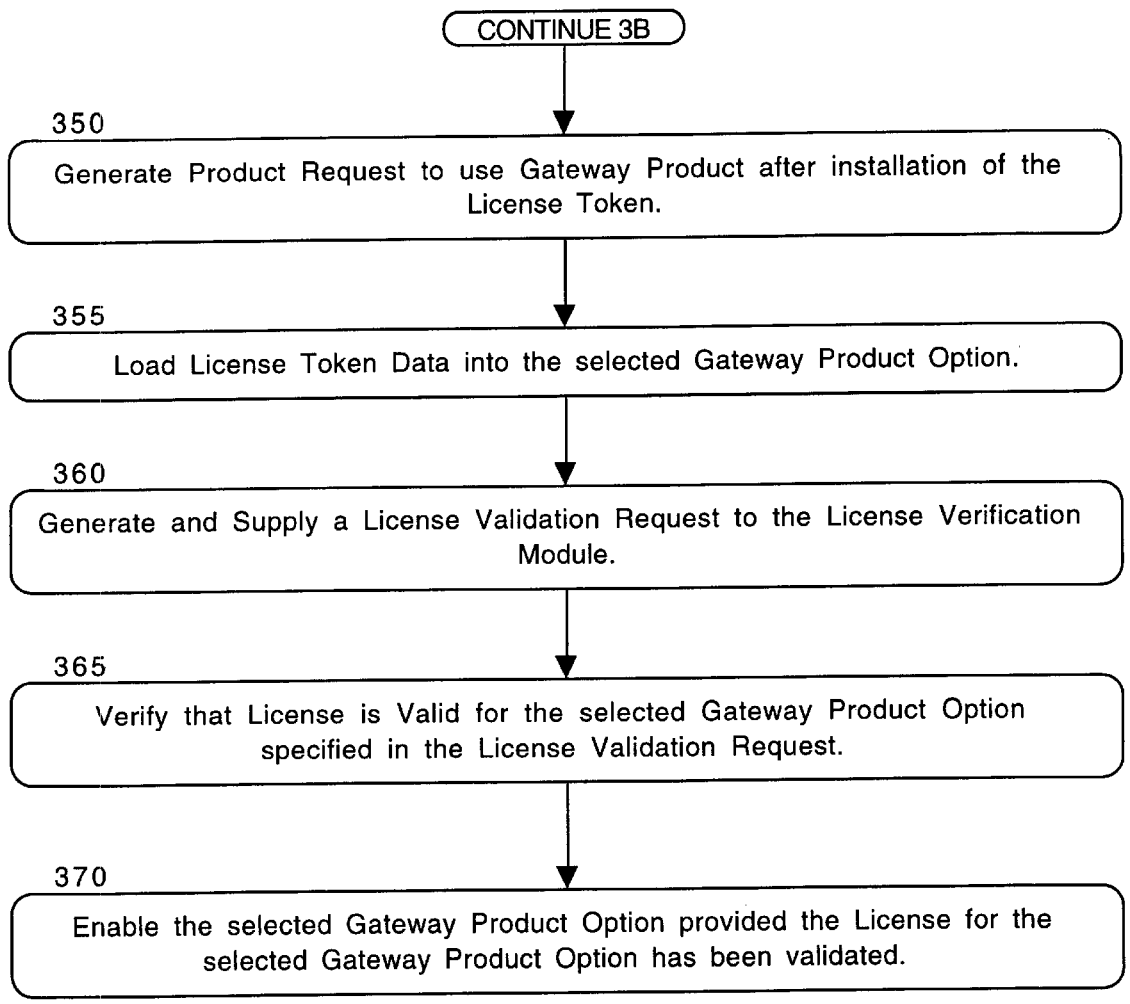
FIG. 3B illustrates an embodiment of a method, in a block-flow diagram format, for use in an embodiment of a cryptographic-based software licensing management device in accordance with the teachings of one embodiment of the present invention

In an alternate embodiment, the client device 102 or user's actual product request to use the particular gateway product option 116, after installation of the license token 122, triggers a license validation process, illustrated in FIG. 3B, wherein the gateway product license is validated before actually enabling the gateway product option(s) 116.

Accordingly, at Block 350, as illustrated in FIG. 3B, the user makes a product request to use the particular gateway product 116 option after installation of the license token 122, the product request is supplied to the License Verification Module (LVM) 126 of the gateway interface device 104.

At Block 355, after the user makes product request, the License Verification Module (LVM) 126 loads the license token data 124 contained in the license token 122 into the selected gateway product option 116. The license token data 124 is used to enable the operation of the gateway product option 116 upon validation of the corresponding license.

Accordingly, at Block 360, the selected gateway product option 116 generates a license validation request which is supplied to the License Verification Module (LVM) 126.

In response to the license validation request, at Block 365, the License Verification Module (LVM) 126 determines whether the license is valid (i.e., the selected gateway product option 116 may be used or otherwise enabled) for the selected gateway product option 116 identified in the license validation request.

In one embodiment, the License Verification Module (LVM) 126 locates the corresponding signed license certification public key 120A, which corresponds to the selected gateway product option 116, in the License Verification Module (LVM) 126. Upon locating the corresponding the signed license certification public key 120A, the License Verification Module (LVM) 126 verifies that the license is valid by re-verifying the digital signatures applied to the signed license certification public key 120A and to the signed license token 122.

In another embodiment, the License Verification Module (LVM) 126 determines whether the license is valid examining the license token data 124 which specify the operational parameters of the actual license e.g., expiration date of the license, type of usage, access privileges, operability of the gateway product option, etc.). For instance, the License Verification Module (LVM) 126 may examine the expiration date contained in the license token data 124 and determine whether the license is valid (i.e., active or expired) for this particular gateway product option 116.

As indicated above, a variety of different license validation processes may be implemented in order to verify that the license is valid before actually enabling the gateway product option 116. As such, the present invention is not limited to such license validation processes, but rather, the above examples are merely illustrative of embodiments of different license validation processes that may be implemented in the present invention.

Accordingly, at Block 370, after the License Verification Module (LVM) 126 verifies that the license is valid (i.e., the selected gateway product 116 may be used or otherwise enabled) for the selected gateway product option(s) 116 identified in the license validation request, the selected gateway product option(s) 116 identified in the license validation request are then enabled or otherwise activated for use.

In one embodiment, the License Verification Module (LVM) 126 generates and supplies a data message to the selected gateway interface device 104, the data message indicating that the license for the selected gateway product option 116 is valid and that the selected gateway product option 116 may be used or otherwise enabled. Accordingly, in response to the data message indicating that the license for the selected gateway product option 116 is valid, the selected gateway product option 116 is enabled or otherwise activated.

In an alternate embodiment, the License Verification Module (LVM) 126 generates and supplies the data message to the client device 102, the data message containing validation data indicating that the license for the selected gateway product option 116 is valid and that the selected gateway product option 116 may be used or otherwise enabled. Accordingly, the client device 102 may then supply the data message to the selected gateway interface device 104 to enable or otherwise activate the selected gateway product option 116.

Figure 4:
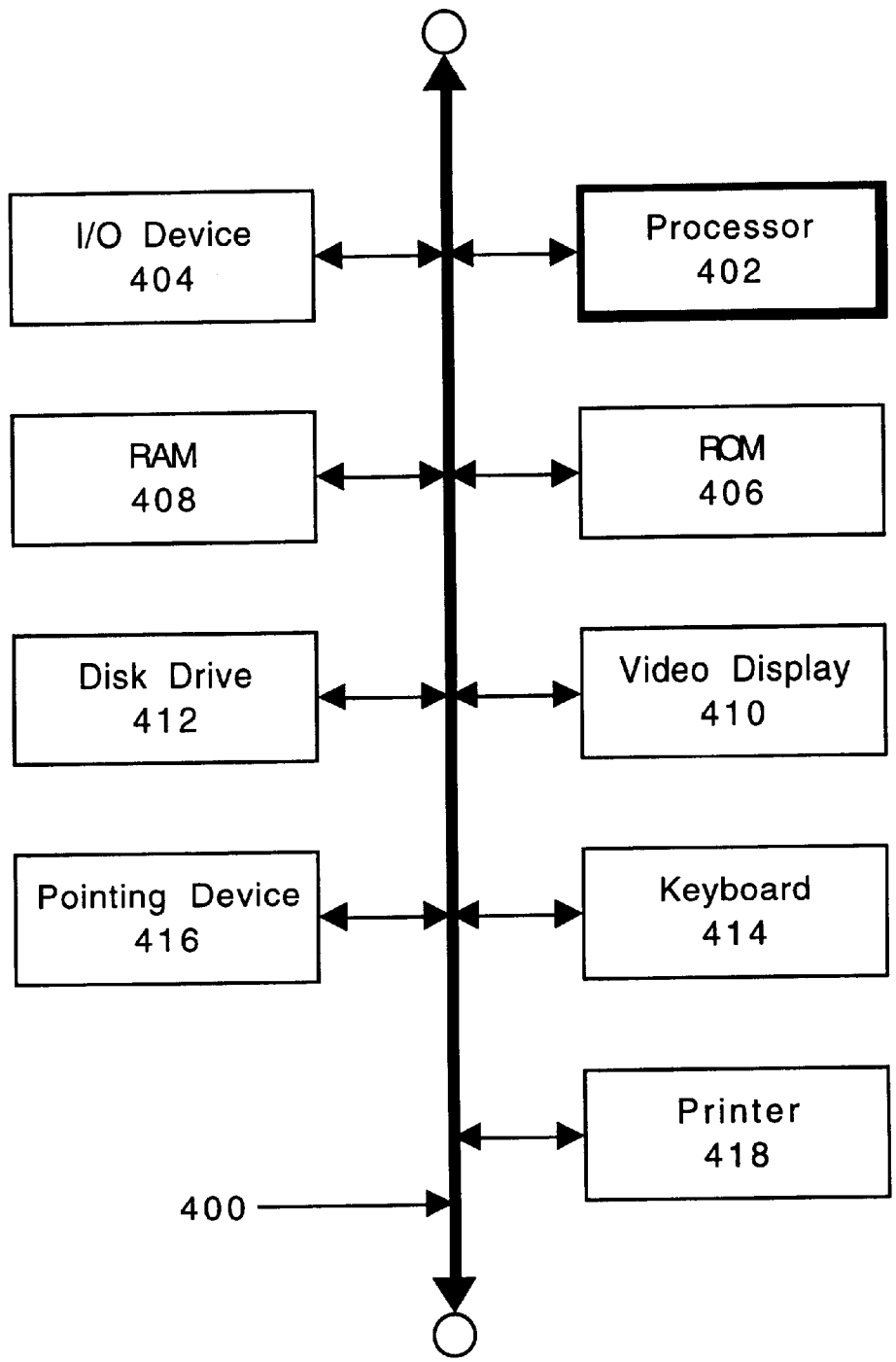
FIG. 4 illustrates an embodiment of a computer system that can be used with the present invention in accordance with the teachings of one embodiment of the present invention.

FIG. 4 illustrates an embodiment of a computer system that can be used with the present invention. The various components shown in FIG. 4 are provided by way of example. Certain components of the computer in FIG. 4 can be deleted from the addressing system for a particular implementation of the invention. The computer shown in FIG. 4 may be any type of computer including a general purpose computer.

FIG. 4 illustrates a system bus 400 to which various components are coupled. A processor 402 performs the processing tasks required by the computer. Processor 402 may be any type of processing device capable of implementing the steps necessary to perform the cryptographic-based software licensing management device operations discussed above. An input/output (I/O) device 404 is coupled to bus 400 and provides a mechanism for communicating with other devices coupled to the computer. A read-only memory (ROM) 406 and a random access memory (RAM) 408 are coupled to bus 400 and provide a storage mechanism for various data and information used by the computer. Although ROM 406 and RAM 408 are shown coupled to bus 400, in alternate embodiments, ROM 406 and RAM 408 are coupled directly to processor 402 or coupled to a dedicated memory bus (not shown).

A video display 410 is coupled to bus 400 and displays various information and data to the user of the computer. A disk drive 412 is coupled to bus 400 and provides for the long-term mass storage of information. Disk drive 412 may be used to store various data sets and other data generated by and used by the a cryptographic-based software licensing management device. A keyboard 414 and pointing device 416 are also coupled to bus 400 and provide mechanisms for entering information and commands to the computer. A printer 418 is coupled to bus 400 and is capable of creating a hard-copy of information generated by or used by the computer.

Figure 5:
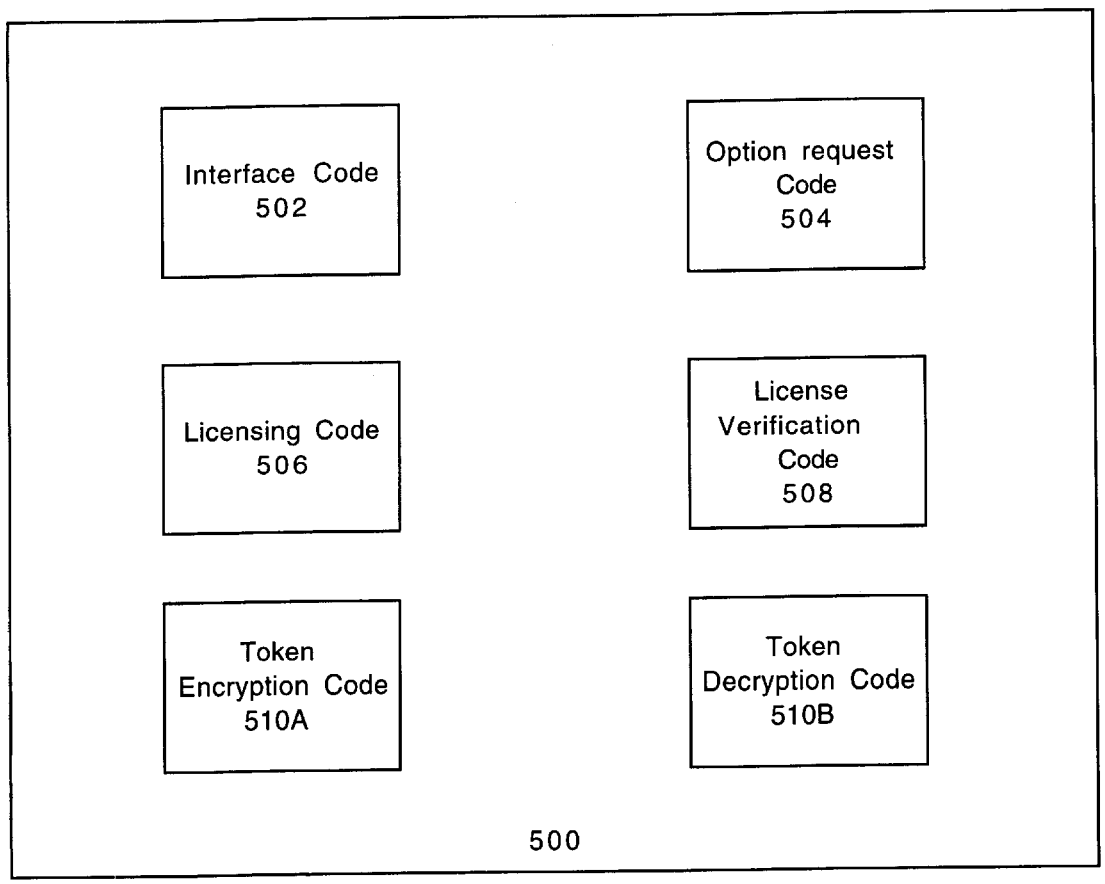
FIG. 5 illustrates an embodiment of a computer-readable medium used by a computer or other processing device system that can be used with the present invention in accordance with the teachings of one embodiment of the present invention.

FIG. 5 illustrates an embodiment of a computer-readable medium 500 containing various sets of instructions, code sequences, configuration information, and other data used by a computer or other processing device. The embodiment illustrated in FIG. 5 is suitable for use with the cryptographic based software licensing management device described above. The various information stored on medium 500 is used to perform various data processing operations. Computer-readable medium 500 is also referred to as a processor-readable medium. Computer-readable medium 500 can be any type of magnetic, optical, or electrical storage medium including a diskette, magnetic tape, CD-ROM, memory device, or other storage medium.

Computer-readable medium 500 includes interface code 502 that controls the flow of information between various devices or components in the a cryptographic-based software licensing management device. Interface code 502 may control the transfer of information within a device (e.g., between the processor and a memory device), or between an input/output port and a storage device. Additionally, interface code 502 may control the transfer of information from one device to another (e.g., the transfer of information between the Licensing Authority (LA) and the gateway interface device).

Computer-readable medium 500 also includes option request code 504 configured to allow a user or client device 102 associated with the gateway interface device 104 to make a gateway product option request for the usage or activation of a particular gateway product option 116 that is associated with a gateway interface device 104. Accordingly, in one embodiment, the gateway product option request contains (1) an identifier or copy of an identification component 134 associated with the particular gateway interface device 104 for which the particular gateway product option 116 is desired; and (2) the identification of the particular gateway product option 116 that is desired to be used or otherwise activated. As such, the gateway product option request contains a copy of an identification component 134 associated with a particular gateway interface device 104, as well as, the identification of the particular gateway product option 116 associated with the gateway interface device 104 that is desired to be used or otherwise activated. Accordingly, the gateway product option request is supplied to licensing code 506.

In response to the gateway product option request, the licensing code 506 generates a license which is configured to enable or activate particular gateway product options 116 specified in the gateway product option request, subject to a process that verifies the authenticity or validity of the license issued by the licensing code 506.

In one embodiment, the licensing code 506 generates a pair of license certification keys 120 (license certification public key 120A and license certification private key 120B). Accordingly, the licensing code 506 is configured to apply a digital signature to the license certification public key 120A using a signature component 132A, also referred to as a Root Private Key, thereby creating a signed license certification public key 120A, also referred to as a certification certificate. Correspondingly, a programmable verification component 132B, also referred to as a Root Public Key, which corresponds to the signature component 132A or Root Private Key, is maintained within the nonvolatile memory 130 (e.g., EEPROM) associated with the gateway interface device 104 and is used to verify the signature applied to the license certification public key 120A by the licensing code 506.

Accordingly, after the license certification public key 120A is signed by the licensing code 506 using the signature component 132A or Root Private Key, the signed license certification public key 120A is supplied to the License Verification Module (LVM) 126. In one embodiment, the License Verification Module (LVM) 126 maintains a local database 126A that is used to store signed license certification public key 120A.

Upon supplying the signed license certification public key 120A to the license verification code 508, the licensing code 506 generates a license token 122 containing license token data 124 that is used to enable the specified gateway product options 116 of the gateway interface device 104. The license token data 124 comprises information such as, but not limited to: the duration period of the license (i.e., license duration); the identity of the particular gateway product option; the identity of the gateway interface device (i.e., identification component 134) associated with the gateway product option request; configuration information for configuring the particular gateway product option; and a variety of other desired or necessary option data associated with the particular gateway product option or options selected.

In one embodiment of the present invention, the license token 122 contains a copy of an identification component 134, indicated in the original gateway product option request, identifying the gateway interface device 104 associated with the original gateway product option request.

Accordingly, after the license token 122 is generated by licensing code 506, the licensing code 506 signs or applies a signature to the license token 122 using the license certification private key 120B.

In one embodiment, the signed license token 122 is encrypted by token encryption code 510A. The encrypted signed license token 122 is then supplied to license verification code 508. Correspondingly, token decryption code 510B is maintained by the license verification code 508 for decrypting the encrypted signed license token 122.

In one embodiment, the license verification code 508 compares the copy of the identification component 134 contained in the signed license token 122 to ensure that the copy of the identification component 134 contained in the signed license token 122 is the same as, or corresponds to, the identification component 134 associated with the particular gateway interface device 104. Provided the copy of the identification component 134 contained in the signed license token 122 is the same as, or corresponds to, the identification component 134 of the particular gateway interface device 104, the signed license token 122 is passed for further processing. If the copy of the identification component 134 contained in the signed license token 122 is the not same as, or does not correspond to, the identification component 134 associated with the particular gateway interface device 104, an error message is generated by license verification code 508, and the signed license token 122 is not passed for further processing.

Accordingly, after receiving the signed license certification public key 120A, the license verification code 508 verifies the signature of the signed license certification public key 120A (i.e., signature applied to the license certification public key 120A using the corresponding signature component 132A or Root Private Key) using the corresponding Root Public Key 132B maintained in the nonvolatile memory 130 (e.g., EEPROM) associated with the gateway interface device 104. The Root Public Key 132B maintained within the non-volatile memory 130 of the gateway interface device 104 is associated with the Root Private Key 132A that applies the digital signature to the license certification public key 120A. As such, the Root Public Key 132B maintained in the non-volatile memory 130 of the gateway interface device 104 is used to verify the signature of the signed license certification public key 120A received by license verification code 508.

Provided the signature of the signed license certification public key 120A (i.e., signature applied by the Licensing Authority (LA) 108) is verified using the corresponding Root Public Key 132B maintained in the nonvolatile memory 130 (e.g., EEPROM) associated with the gateway interface device 104, the verification process is allowed to proceed. If the signature of the signed license certification public key 120A (i.e., signature applied by the Licensing Authority (LA) 108) is not verified using the corresponding Root Public Key 132B maintained in the nonvolatile memory 130, an error message is generated, and the verification process is terminated.

Next, the license verification code 508 verifies the signature of the signed license token 122 (i.e., signature applied to the license token 122 using the license certification private key 120B) using the corresponding license certification public key 120A that corresponds to the license token 122.

Provided the signature of the license token 122 is verified using the corresponding signed license certification public key 120A received by the license verification code 508, the verification process proceeds. If the signature of the license token 122 is not verified the using the corresponding signed license certification public key 120A, an error message is generated, and the verification process is terminated.

Accordingly, provided the signature applied to the license token 1223 is verified using the corresponding license certification public key 120A, the license token options or license token data 124 is verified. The license token options or license token data 124 specify the operational parameters of the license (e.g., expiration date of the license, type of usage, access privileges, operability of the gateway product option, etc.). Accordingly, provided the operational parameters of the license are appropriate for the gateway interface device 104, the process proceeds, otherwise, an error message is generated and the process is terminated.

Subsequently, the license token 122 containing the necessary license token data 124 for enabling the particular gateway product option(s) 116 identified in the request is installed in the gateway interface device 104 by license verification code 508.

In one embodiment of the present invention, the installed license token containing the necessary license token data 124 for enabling the particular gateway product option(s) 116, immediately enables the particular gateway product option(s) 116 identified in the original gateway product option request.

In an alternate embodiment, the client device 102 or user's actual product request to use the particular gateway product option 116, after installation of the license token 122, triggers a license validation process, wherein the gateway product license is validated before actually enabling the gateway product option(s) 116.

Accordingly, the user makes a product request to use the particular gateway product option 116 after installation of the license token 122, the product request is then supplied to the license verification code 508.

After the user makes the product request the license verification code 508 loads the license token data 124 contained in the license token 122 into the selected gateway product option 116. The license token data 124 is used to enable the operation of the gateway product option 116 upon validation of the gateway product license.

Accordingly, the selected gateway product option 116 generates a license validation request that is supplied to the license verification code 508.

In response to the license validation request, the license verification code 508 verifies that the license is valid (i.e., the selected gateway product option 116 may be used or otherwise enabled) for the selected gateway product option 116 identified in the license validation request.

In one embodiment, license verification code 508 verifies that the license is valid by re-verifying the signatures applied to the signed license certification public key 120A and to the signed license token 122.

In another embodiment, the license verification code 508 determines whether the license is valid examining the license token data 124 which specify the operational parameters of the actual license e.g., expiration date of the license, type of usage, access privileges, operability of the gateway product option, etc.). For instance, the license verification code 508 may examine the expiration date contained in the license token data 124 and determine whether the license in valid (i.e., active or expired) for this particular gateway product option 116.

As indicated above, a variety of different license validation processes may be implemented in order to verify the license is valid before actually enabling the gateway product option 116. As such, the present invention is not limited to such license validation processes, but rather, the above examples are merely illustrative of embodiments of different license validation processes that may be implemented in the present invention.

Accordingly, after the license verification code 508 verifies that the license is valid (i.e., the selected gateway product may be used or otherwise enabled) for the selected gateway product option(s) 116 identified in the license validation request, the selected gateway product option(s) 116 identified in the license validation request are then enabled or otherwise activated for use.

In one embodiment, the license verification code 508 generates and supplies a data message to the selected gateway interface device 104, the data message indicating that the license for the selected gateway product option 116 is valid and that the selected gateway product option 116 may be used or otherwise enabled. Accordingly, in response to the data message indicating that the license for the selected gateway product option 116 is valid, the selected gateway product option 116 is enabled or otherwise activated.

In an alternate embodiment, the license verification code 508 generates and supplies the data message to the client device 102, the data message containing validation data indicating that the license for the selected gateway product option 116 is valid and that the selected gateway product option 116 may be used or otherwise enabled. Accordingly, the client device 102 may then supply the data message to the selected gateway interface device 104 to enable or otherwise activate the selected gateway product option 116.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A cryptographic-based license management device, the device comprising:
   a license authority configured to generate a license in response to a product option request from a client device;
   an interface module having a plurality of product options that are selectively enabled for use by the client device in response to a valid license issued by the license authority;
   a non-volatile memory associated with the interface module, the non-volatile memory module containing a programmable verification component for determining the authenticity of the license; and
   a license verification module associated with the interface module, the license verification module configured to verify the authenticity of a license using the programmable verification component contained within the non-volatile memory and enable access by the client device to selected product options provided the license is verified by the license verification module.

2. The device of claim 1, wherein the license authority is configured to generate a set of certification keys and a license token license in response to the product option request.

3. The device of claim 2, wherein the set of certification keys comprise a license certification public key and a license certification private key.

4. The device of claim 3, wherein the license authority is configured to apply a digital signature to the license certification public key using a root private key.

5. The device of claim 4, wherein the programmable verification component comprises a root public key that corresponds to the root private key.

6. The device of claim 5, wherein the license authority is configured to supply the signed license certification public key to the license verification module.

7. The device of claim 6, wherein the license authority is configured to apply a digital signature to the license token and supply the signed license token to the license verification module, the license token containing license token data that enables selected gateway products identified in the product option request.

8. The device of claim 7, wherein the license authority encryptes the signed license token using a token encryption key before supplying the signed license token to the license verification module.

9. The device of claim 8, wherein the license verification module decryptes the encrypted signed license token with a token decryption key.

10. The device of claim 7, wherein the license verification module is configured to verify the digital signature of the license certification public key with the root public key maintained in the non-volatile memory.

11. The device of claim 10, wherein the license verification module is configured to verify the digital signature of the license token with the license certification public key provided the digital signature applied to the license certification public key has been verified with the root public key.

12. The device of claim 11, wherein the license verification module is configured to enable the selected product options associated with the interface module provided the digital signature applied to the license token has been verified with the license certification public key.

13. A method for cryptographic-based license management, the method comprising:
   generating a license in response to a product option request from at least one client device, the product option request identifying selected product options provided by an interface module to the at least one client device;
   applying a digital signature to the license;
   supplying the license to the interface module;
   verifying the digital signature of the license with a verification component associated with the interface module; and
   enabling the selected product options provided by the interface module if the digital signature of the license has been verified with the verification component.

14. The method of claim 13, wherein the step of generating a license comprises:

generating a license certification public key and a license certification private key in response to the product option request; and generating a license token containing license token data configured to enable selected product options of the interface module.

15. The method of claim 14, wherein the step of applying a digital signature to the license comprises:

applying a digital signature to the license certification public key with a root private key; and applying a digital signature to the license token with the license certification private key.

16. The method of claim 15, wherein the step of supplying the license to the interface module comprises:

supplying the signed license certification public key and signed license token to a license verification module associated with the interface module.

17. The method of claim 16, wherein the step of verifying the digital signature of the license comprises:

verifying the digital signature applied to the signed license certification public key with a root public key associated with the interface module, the root public key corresponding to the root private key; and verifying the digital signature applied to the license token with the license certification public key provided the digital signature applied to the license certification public key has been verified with the root public key.

18. The method of claim 17, wherein the root public key is maintained within a non-volatile memory associated with interface module.

19. The method of claim 17, wherein the step of enabling the selected product options comprises:

enabling the selected product options associated with an interface module provided the digital signature of the license token has been verified with the license certification public key.

20. The method of claim 14, wherein the step of enabling the selected product options comprises:

loading the license token data into the selected product options of the interface module in response to a user request for the selected product options;

generating a license validation request which is supplied to the license verification module, wherein the license verification module verifies that usage of the selected product options is authorized; and enabling the selected product options provided usage of the selected product options is authorized.

21. A computer readable medium containing executable instructions which, when executed in a processing system, causes the processing system to perform a method for cryptographic-based license management, the method comprising:

generating a license in response to a product option request from at least one client device, the product option request identifying selected product options provided by an interface module to the at least one client device;

applying a digital signature to the license;

supplying the license to the interface module;

verifying the digital signature of the license with a verification component associated with the interface module; and enabling the selected product options provided by the interface module if the digital signature of the license has been verified with the verification component.

22. The computer readable medium of claim 21, wherein the step of generating a license comprises:

generating a license certification public key and a license certification private key in response to the product option request; and generating a license token containing license token data configured to enable selected product options of the interface module.

23. The computer readable medium of claim 22, wherein the step of applying a digital signature to the license comprises:

applying a digital signature to the license certification public key with a root private key; and applying a digital signature to the license token with the license certification private key.

24. The computer readable medium of claim 23, wherein the step of supplying the license to the interface module comprises:

supplying the signed license certification public key and signed license token to a license verification module associated with the interface module.

25. The computer readable medium of claim 24, wherein the step of verifying the digital signature of the license comprises:

verifying the digital signature applied to the signed license certification public key with a root public key associated with the interface module, the root public key corresponding to the root private key; and verifying the digital signature applied to the license token with the license certification public key provided the digital signature applied to the license certification public key has been verified with the root public key.

26. The computer readable medium of claim 25, wherein the root public key is maintained within a non-volatile memory associated with interface module.

27. The computer readable medium of claim 25, wherein the step of enabling the selected product options comprises:

enabling the selected product options associated with an interface module provided the digital signature of the license token has been verified with the license certification public key.

28. The computer readable medium of claim 22, wherein the step of enabling the selected product options comprises:

loading the license token data into the selected product options of the interface module in response to a user request for the selected product options;

generating a license validation request which is supplied to the license verification module, wherein the license verification module verifies that usage of the selected product options is authorized; and enabling the selected product options provided usage of the selected product options is authorized.

* * * * *